United States Patent [19]

Rickert, Jr.

[11] 4,181,773
[45] Jan. 1, 1980

[54] PROCESS FOR RENDERING SURFACES PERMANENTLY WATER WETTABLE AND NOVEL PRODUCTS THUS-PRODUCED

[75] Inventor: Milton E. Rickert, Jr., Louisville, Ky.

[73] Assignee: General Electric Company, Louisville, Ky.

[21] Appl. No.: 891,440

[22] Filed: Mar. 29, 1978

[51] Int. Cl.² .................................................. B32B 5/16
[52] U.S. Cl. ......................................... 428/329; 165/133; 427/341; 427/315 R; 427/386; 427/388 A; 427/388 C; 428/336; 428/418; 428/463
[58] Field of Search ................... 427/341, 340, 386 R, 427/385 R, 388 A, 388 C; 428/418, 463, 336, 329; 165/133

[56] References Cited
U.S. PATENT DOCUMENTS

| 3,468,753 | 9/1969 | Vincent et al. | 428/328 |
| 4,037,018 | 7/1977 | McGinniss | 428/418 |

OTHER PUBLICATIONS
Dispal Alumina, Continental Oil Co. pp. 1–7.

Primary Examiner—Ronald H. Smith
Assistant Examiner—Janyce A. Bell
Attorney, Agent, or Firm—Millen & White

[57] ABSTRACT

The surfaces of articles of manufacture fabricated from aluminum and other materials which are not permanently water wettable are rendered permanently water wettable by coating the surface with a continuous film containing colloidal alumina of a water soluble form of basic film forming polymer which is curable to water insolubility; curing the polymer to water insolubility; and hydrolyzing the surface portion only of the cured polymer.

19 Claims, 1 Drawing Figure

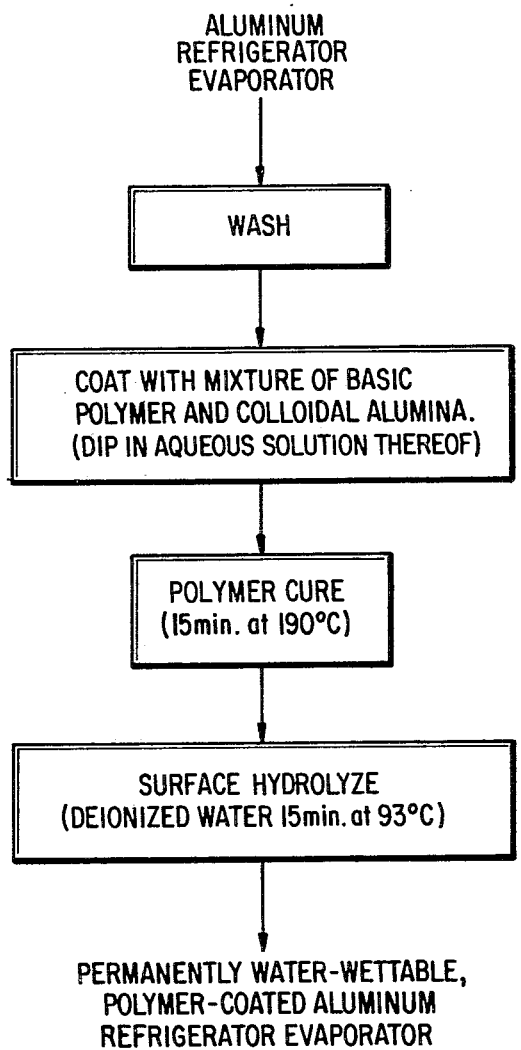

PROCESS FOR RENDERING SURFACES PERMANENTLY WATER WETTABLE AND NOVEL PRODUCTS THUS-PRODUCED

BACKGROUND OF THE INVENTION

This invention relates to a process for rendering surfaces permanently water wettable and to water wettable articles of manufacture thus-produced.

It is sometimes desirable that a surface of an article of manufacture exposed to water be water wettable. The term "water wettable" as used herein means the ability of the surface to retain a substantially unbroken film of water thereon, preferably for at least 10 seconds and more preferably for at least 30 seconds after removal from water, e.g., after being immersed in water or flushed with a stream of water. This property is desirable because a water wettable surface of an article of manufacture exposed to water condensation has less of a tendency to drip droplets of water therefrom than a surface which is not water wettable. Instead of dripping in a random fashion from the surface, the water migrates downwardly along the surface in a predictable path and if droplets form, they can be collected at a predetermined desired point. An example of articles of manufacture where water wettability is a necessary property is an aluminum refrigerator evaporator, whose external surfaces conventionally are rendered permanently water wettable by metal anodizing, and the external surfaces of other evaporators and heat exchangers whose efficiency is dependent on the surfaces being wet with water. Other examples of articles of manufacture in which water wettability is a desirable property are those which are maintained below ambient temperature in a humid atmosphere and which are therefore susceptible to condensation and dripping, e.g., plastic, for example, PVC, polyethylene, and metal, for example, aluminum, copper and iron, cold water pipes and sheets forming the interior surfaces of refrigerators.

Another example of articles of manufacture where water wettability is a desirable or necessary property are those formed of or having a coating on the surface thereof of a hydrophobic polymer, which are to be coated with an aqueous coating composition. It is difficult and sometimes impossible to apply a uniform coating of a desired aqueous coating composition to such hydrophobic surfaces. Therefore, the surface of the polymer must be physically or chemically altered to render it receptive to the selected aqueous coating composition.

It is relatively simple to render metal surfaces temporarily water wettable. For example, acidic aqueous colloidal dispersions of α-alumina are used commercially to render surfaces temporarily water wettable. See Trade Literature "Dispal ® Alumina", Continental Oil Company, Market Development Department, Saddle Brook, New Jersey. Although that literature states that the durability of the alumina film is increased by incorporating a small percentage, e.g., 2%, of acrylic emulsion in the dispersion, the wettability imparted by the alumina film is still relatively impermanent and moreover, is far less effective than anodizing in protecting the aluminum substrate from corrosion and/or staining. Therefore, this method of rendering aluminum articles of manufacture water wettable is unsatisfactory for products which are subjected for long periods of time to conditions which could stain or corrode the surface of the aluminum, as is the case of the interior aluminum surfaces of refrigerator boxes and the exterior surfaces of refrigerator and air conditioner evaporators.

The coating of aluminum with polymeric coatings is, of course, well known in the prior art.

U.S. Pat. No. 3,464,854 discloses a coating composition which can be applied to aluminum surfaces. See Example 1, Column 4, line 25. The compositions consist of an epoxy resin binder in aqueous dispersion with a major amount of particulate filler. The filler can be selected from powdered metal, such as aluminum, aluminosilicates and metal oxides, such as alumina. Additionally, an amine curing agent is provided in the composition.

U.S. Pat. No. 3,468,753 describes a method for making a laminate in which a metal sheet, such as aluminum, has a layer of co-polymer ethylene and unsaturated carboxylic acids such as acrylic and methacrylic acid, applied thereto. The polymeric layer may include a filler material such as aluminum metal powders of Kaolinite, etc.

The hydrophilization of hydrophobic polymers is also known in the prior art.

U.S. Pat. No. 3,935,342 discloses a process wherein hydrophobic polymers are treated by contacting them with silylated acrylate or methacrylate monomers, polymerizing the monomer and then hydrolyzing the polymer to break the siloxy bonds and produce free hydroxy groups. The product can be used in a large number of coating applications. See Column 1, lines 45–53.

For illustrative examples of water dispersible film forming polymers having a basic nitrogen atom, see U.S. Pat. Nos. 3,446,723; 3,454,482; 3,455,806; 3,458,420; and 3,617,458, whose disclosures are incorporated herein by reference.

It is an object of this invention to provide a process for rendering permanently water wettable surfaces of articles of manufacture whose surfaces either are not water wettable or lose their water wettability upon exposure to the atmosphere. Another object is the provision of novel articles of manufacture having a surface rendered permanently water wettable according to the process of this invention. Other objects will be apparent to those skilled in the art to which this invention pertains.

SUMMARY OF THE INVENTION

In a process aspect, this invention relates to a process for rendering permanently water wettable a surface of an article of manufacture which normally is not permanently water wettable, which comprises the steps of:

(a) coating the surface with a continuous film containing colloidal alumina of a water soluble form of a film forming basic polymer which is curable to water insolubility;

(b) curing the coated polymer on the substrate surface to water insolubility; and (c) thereafter hydrolyzing substantially only the surface portion of the cured polymer.

In an article of manufacture aspect, this invention relates to aluminum articles of manufacture formed of aluminum presenting a surface rendered permanently water wettable by a water-insoluble coating thereon of a water-soluble basic polymer which has been cured to water-insolubility and has been rendered water wettable according to the process of this invention.

DESCRIPTION OF THE DRAWING

The FIGURE is a self explanatory block flow sheet of a preferred embodiment of this invention.

DETAILED DESCRIPTION

The articles of manufacture whose surface can be rendered permanently water wettable according to the process of this invention are those formed from materials which normally are not water wettable or which lose their water wettability after manufacture, upon exposure to air and/or water and thus include those formed from a metal, e.g., aluminum, copper, brass, bronze, nickel, iron, stainless steel and novle metals, e.g., gold, silver and platinum, and those formed from or coated with a water insoluble hydrophobic polymer, including the thermoplastics, e.g., polystyrene, styrene-acrylonitrile resins, polyvinyl chloride, polyvinyl acetate, polyethylene, polypropylene, polybutenes, acetals, acrylics, thermoplastic polyesters and nylons, and the thermoset polymers, e.g., alkyd, epoxy, phenolic, phenol-aralkyl, urea and melamine resins and thermoset unsaturated polyesters and polyurethanes. If the article of manufacture is formed of or coated with a polymer, necessarily the polymer must be one which can be coated with a water soluble basic polymer as defined herein and which is stable in the curing step. Preferred substrates are those formed from a base metal, especially those formed from aluminum or an aluminum alloy, e.g., of high Si content, or a composite of aluminum and steel because, inter alia, the aluminum is protected from the staining which occurs on unprotected aluminum, as well as being rendered permanently water wettable.

The article of manufacture can be in any solid shaped form, including rigid and flexible sheets, films, foils and extruded, cast, stamped and machined three-dimensional shaped articles, including water pipes and the heat exchanger surfaces of air conditioners and evaporators and the frames of refrigerator doors, drain troughs, fresh food liner tops and other refrigerated areas which are susceptible to sweating. Preferred are those forming the heat exchanger surface of evaporators, especially aluminum refrigerator evaporators, and other fabricated metal articles of manufacture.

The basic polymers used to coat the starting substrate are those which:
(a) form water soluble salts with acids;
(b) will form a continuous coherent film on the selected substrate; and
(c) are curable to water-insolubility.

These properties, rather than the specific chemical structure of a basic polymer, determine its suitability for use in this invention. Therefore, a wide variety of structural types of film-forming basic polymers, i.e. having a basic nitrogen atom, can be employed.

Preferred basic polymers are curable basic resins which can be deposited as a film and from an aqueous dispersion thereof, onto an article by cationic electrodeposition. Examples of such polymers are copolymers derived from (1) 3–50% by weight of a 5- or 6-membered, heterocyclic N-vinyl amine, e.g., N-vinylpyrazole and N-vinylindole; (2) 3–30% of an amide of acrylic and/or methacrylic acid; (3) 20–94% by weight of one or more of an alkyl ester of acrylic or methacrylic acid, styrene and alkylvinylbenzene; and (4) 0–30% by weight of another ethylenically unsaturated monomer. Other examples are polymers otherwise corresponding to the foregoing wherein (1) is either an aminoalkyl acrylate or methacrylate or an ethylenically unsaturated basic amino compound of up to 20 carbon atoms of the formula $CH_2=CR_1-CO-A-(C_nH_{2n})-NR_2R_3$ wherein $R_1$ is H or $CH_3$, one of $R_2$ and $R_3$ is H and the other is alkyl of 1–4 carbon atoms, n is an integer from 1–6, A is an oxygen atom or $NR_4$ wherein $R_4$ has the values of $R_2$ and $R_3$. Another type of basic polymer which can be employed are those derived from an unsaturated carboxylic acid, an epoxidized material and a compound having a pendant amine group, e.g., those derived from a lower alkyl ester of acrylic or methacrylic acid. For further disclosures of such basic amines and coating substrates with films thereof by electrodeposition, see, e.g., U.S. Pat. No. 3,446,723; 3,454,482; 3,455,806; 3,458,420; and 3,617,458.

The polymers are those which form water soluble acid salts. The term "water soluble" as used herein embraces "colloidally dispersible in water" since many of the high molecular weight polymers which are operable in the process of this invention form colloidal dispersions in water rather than true solutions.

A wide variety of acids can be employed to render the basic polymers soluble. Preferred are those conventionally employed to form water soluble acid salts of polymers, especially low molecular weight aliphatic acids; preferably acetic and formic acid and other low molecular weight alkanoic acids, e.g., of 1–5 carbon atoms.

Necessarily, the selected basic polymer must be one which is capable of forming a continuous film on the starting selected substrate. The preferred basic polymers will form such films on many hydrophobic substrates. However, with some polymers and/or hydrophobic substrates, some adjustment of the vehicle from which the polymer is deposited, e.g., by varying the concentration of the polymer therein or adding a wetting agent and/or an organic solvent thereto, may be required. However, such techniques are standard and well known in the coating art.

The film of the selected basic polymer deposited on the selected substrate must also be curable to water insolubility both at acid and alkaline pH's. In other words, the cured polymer is neither water soluble nor forms water soluble salts. Some basic polymers are self-curing. Curing can also be accomplished by including a curing agent in the film deposited on the selected substrate, e.g., those conventionally employed as cross-linking agents for basic polymers and which effect cross-linking when the film is heated or is exposed to another form of energy required to initiate the cross-linking reaction, e.g., actinic or ultraviolet light or gamma ray irradiation. In addition to the activating energy, a reaction catalyst is sometimes also required. To the extent one is required, it is included in the term "curing agent" as used herein.

In carrying out Step (a) of the process of this invention, a surface of the selected starting substrate is coated with a continuous film containing colloidal alumina of a water soluble form of the selected basic polymer. This can be accomplished in one embodiment by dipping the surface of the substrate in or spraying the surface of the substrate with an aqueous solution (either a true solution or colloidal dispersion), containing colloidal alumina dispersed therein of an acid salt of the selected basic polymer and then heating the film to its curing temperature of the basic polymer.

The basic polymer is preferably in the form of an organic acid salt thereof. Although salts of strong acids, e.g., phosphoric, are also operable, they are not preferred.

Preferably, the polymer coating applied to the substrate has a thickness of about $3 \times 10^{-3}$ to about $40 \times 10^{-3}$ mm., more preferably about $9 \times 10^{-3}$ mm. The thickness of the coating can be regulated by the concentration of the polymer in the solution, the viscosity of the solution, the number of immersions, the spraying time and/or the final voltage when the coating is applied electrolytically.

A film of the polymer can also be applied to the substrate by coating the substrate with a solution of the polymer in an organic solvent and then volatilizing the organic solvent, or by electrostatic spraying or hot melt techniques, employing conditions which leave a continuous film of the uncured polymer on the substrate into which colloidal alumina can be embedded before the polymer is cured. Such conditions are well known in the coating art. In following this aspect of the process of this invention, the uncured basic polymer forming the film coating on the substrate is contacted with colloidal alumina.

The basic polymer forming the coating on the selected substrate can be hydrated or dry when contacted with the colloidal alumina under aqueous conditions. If the polymer is moist, the colloidal alumina can be applied to the film of the polymer as a dry solid, preferably a micronized powder, with the moisture of the coating providing the requisite aqueous vehicle for the interaction of the alumina with the uncured basic polymer. However, it is ordinarily more convenient and preferred to employ an aqueous suspension of the alumina in the aqueous solution of the basic polymer.

Since the interaction thereof with the basic polymer need occur only on the surface of the polymer coating, the theoretical minimum amount of alumina required to effect the requisite interaction with the basic polymer is miniscule. However, the most convenient method of achieving the interaction of the basic polymer and the alumina is by including the alumina in the aqueous solution of the basic polymer, thereby including in the film of the polymer an amount of alumina far in excess of the theoretical minimum.

In step (b) of the process of this invention, the polymer coating on the substrate is rendered permanent by curing the polymer to water insolubility. The conditions employed in the curing step are determined by the selected polymer. Although curing of the basic polymer can be achieved with some curing agents and basic polymers by irradiation with actinic, or ultraviolet light or gamma rays, it is ordinarily preferred to cure by heating the coated substrate, e.g., at about 135° to 250° C., preferably about 150°-200° C., until the basic polymer is insolubliized, usually for a few minutes, e.g., from about 30 seconds to one or more hours, preferably about 5 to 30 minutes. Methods for determining the optimum conditions of time and temperature are well known in the coating art.

The cured polymer ordinarily is not water wettable. Therefore, in step (c) of the process of this invention, substantially only the surface portion of the cured polymer is hydrolyzed to impart water wettability thereto. Only a mild hydrolysis at any pH is required, e.g., water 70° to 100° C. for about 30 to 5 minutes; dilute aqueous $NH_4OH$ or $NaOH$, e.g., 0.25-0.05 M, at 20° to 70° C. for about 10 minutes to 10 seconds; or dilute acetic or sulfuric acid, e.g., 0.01 to 0.1 M, at 20° to 70° C. for about 10 to 1 minutes.

The cured and surface hydrolyzed polymer coating on the substrate is permanent as evidenced by its resistance to abrasion, i.e., 10 finger strokes with a wet paper towel, and resistance to water, i.e., 10 days immersion at 49° C. It is water wettable, as evidenced by the retention of a substantially continuous film of water thereon while in a vertical position for at least 10 seconds after immersion in or flooding with water. It is permanently water wettable, as evidenced by its ability to retain its water wettability after being immersed for 240 hours in water at 49° C.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

An aqueous solution of basic polymer was prepared by mixing an aqueous dispersion (about 26% solids) of an organic acid salt of an epoxide resin containing free amine groups sold by PPG Industries Inc., Pittsburg, Pennsylvania, under the trade name PPG A2445 (described in U.S. Pat. No. 3,619,398) with an equal volume of deionized water. (For a description of basic polymers containing epoxy resins and free amine groups, see U.S. Pat. No. 3,617,458).

A colloidal dispersion of hydrated aluminum oxide was prepared by adding 19 grams of glacial acetic acid to 877 grams of deionized water in a General Electric Model BL3 blender; with the blender on stir, slowly adding 104 grams of Conoco "Catapal" ® SB Alumina to the dilute acid; stirring the mixture for one hour. A portion of the resulting colloidal dispersion was thereafter diluted with an equal volume of deionized water.

80 Milliliters each of the resulting colloidal dispersion and of the diluted dispersion were added to 400 milliliters of the solution of the polymer.

A clean aluminum panel was dipped into the above mixture for about three seconds and was then heated in a forced air oven for 20 minutes at 190° C. The panel was then immersed in deionized water for 15 minutes at 93°-100° C.

The coated panel was wetted under running tap water and upon removal from the running stream, the water sheeted or spread only on the portion of the panel which had received the hot water treatment. The sheet was retained in an essentially unbroken film for more than 10 seconds with the panel in a vertical position. The contact angle of deionized water on the wettable portion of the panel was 53°-60°. The coating was abrasion resistant. Immersing the panel in 49° C. water for 11 days turns the uncoated portion of the panel very dark as a result of this exposure but leaves the coated portion of the aluminum in an as-produced condition.

EXAMPLE 2

A preferred method of performing the process of this invention on a commercial scale is shown schematically in the drawing.

A fresh food evaporator for a Model TB 14 General Electric home refrigerator from the fabricating plant is immersed in a cleaner (Chemetron Alkalame ® AC 8) for one min. at 77° C., then sprayed with a water rinse for 30 sec. at 60° C., then sprayed with recirculating deionized water for 30 sec. at room temperature and then for 5 seconds with fresh deionized water at room temperature.

The washed evaporator is then dipped for 15 seconds in a 120 gal. recirculating bath of the dispersion of basic polymer and colloidal alumina described in Example 1.

Without rinsing, the coated evaporator is then transferred to a circulating hot air (190° C.) for 20 minutes. The evaporator is then dipped for 15 minutes in deionized hot water at 95° C. The thus-treated evaporator when wet with water forms a substantially continuous film of water on its surface which persists for at least 10 seconds.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for rendering permanently water wettable a surface of an article of manufacture which is not permanently water wettable, which comprises the steps of:
   (a) coating the surface with a continuous film, containing colloidal alumina, of a water soluble form of a film forming basic polymer which is curable to water insolubility;
   (b) curing the coated polymer on the substrate surface to water insolubility; and
   (c) thereafter rendering the cured coating water wettable by hydrolyzing substantially only the surface portion of the cured polymer.

2. The process of claim 1, wherein the surface is metal.

3. The process of claim 2, wherein the metal is aluminum.

4. The process of claim 3, wherein the article of manufacture is a refrigerator evaporator.

5. A process of claim 1 wherein the polymer and colloidal alumina are applied to the surface from an aqueous solution of an acid salt of the polymer containing the colloidal alumina dispersed therein.

6. The process of claim 1, wherein the acid salt of the polymer is a salt of an organic acid.

7. The process of claim 1, wherein the organic acid is acetic or formic acid.

8. The process of claim 1, wherein the polymer is an epoxy resin containing an amine functionality.

9. The process of claim 1, wherein in step (c) the polymer is hydrolyzed with water at a pH of 7 or less.

10. The process of claim 1, wherein the polymer coating has a thickness of about $3 \times 10^{-3}$ to about $40 \times 10^{-3}$ mm.

11. The process of claim 1, wherein the surface is aluminum, wherein in step (a) the coating of the basic polymer is applied to the surface of the substrate from an aqueous solution of an organic acid salt thereof containing the colloidal alumina dispersed therein and wherein in step (b) the polymer is cured by heating.

12. The process of claim 11, wherein in step (a) the surface is coated with the polymer by dipping the substrate in the aqueous solution of the polymer.

13. The process of claim 11, wherein the organic acid is acetic or formic acid.

14. The process of claim 11, wherein the polymer coating has a thickness of about $3 \times 10^{-3}$ to about $40 \times 10^{-3}$ mm.

15. The process of claim 14, wherein the article of manufacture is a refrigerator evaporator, wherein in step (a) the surface is coated with the polymer by dipping the evaporator in the aqueous solution of an acetic or formic salt of the polymer.

16. An article of manufacture formed of aluminum presenting a surface rendered permanently water wettable by a water-insoluble coating thereon of a water-soluble basic polymer which has been cured to water-insolubility and rendered water wettable according to the process of claim 3.

17. An aluminum article of manufacture according to claim 16, wherein the polymer contains pendant amine groups.

18. An aluminum refrigerator evaporator according to claim 17.

19. A metal article of manufacture presenting a surface rendered permanently water wettable by a water-insoluble coating thereon of a water-soluble basic polymer which has been cured to water-insolubility and rendered water wettable according to the process of claim 2.

* * * * *